United States Patent
Wan et al.

(10) Patent No.: US 11,090,562 B2
(45) Date of Patent: Aug. 17, 2021

(54) METHOD AND APPARATUS FOR GENERATING VIRTUAL RESOURCES IN THREE-DIMENSIONAL GAME SCENE

(71) Applicant: NETEASE (HANGZHOU) NETWORK CO., LTD., Zhejiang (CN)

(72) Inventors: Changkun Wan, Zhejiang (CN); Jianfeng Shen, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 0 days.

(21) Appl. No.: 16/638,143

(22) PCT Filed: Oct. 11, 2018

(86) PCT No.: PCT/CN2018/109863
§ 371 (c)(1),
(2) Date: Feb. 11, 2020

(87) PCT Pub. No.: WO2019/128381
PCT Pub. Date: Jul. 4, 2019

(65) Prior Publication Data
US 2020/0316465 A1 Oct. 8, 2020

(30) Foreign Application Priority Data
Dec. 29, 2017 (CN) .......................... 201711484201.3

(51) Int. Cl.
*A63F 13/52* (2014.01)

(52) U.S. Cl.
CPC .......... *A63F 13/52* (2014.09); *A63F 2300/66* (2013.01)

(58) Field of Classification Search
CPC .......... A63F 13/52; A63F 13/63; A63F 13/42; A63F 2300/66; G06T 17/20; G06T 19/20
See application file for complete search history.

(56) References Cited

U.S. PATENT DOCUMENTS

| | | | | |
|---|---|---|---|---|
| 6,804,635 | B1 * | 10/2004 | Dhondt | G06T 17/20 345/419 |
| 8,692,827 | B1 * | 4/2014 | Guskov | G06T 17/05 345/423 |

(Continued)

FOREIGN PATENT DOCUMENTS

| | | |
|---|---|---|
| CN | 104001329 A | 8/2014 |
| CN | 104331587 A | 2/2015 |

(Continued)

OTHER PUBLICATIONS

OMGcraft—Minecraft Tips & Tutorials, Coordinates Without F3 in Minecraft 1.13, Posted Dec. 5, 2017 on YouTube <https://www.youtube.com/watch?v=R9TlcDK-WV8> (Year: 2017).*

(Continued)

*Primary Examiner* — Chase E Leichliter
(74) *Attorney, Agent, or Firm* — Gang Yu (57) ABSTRACT

A method and apparatus for generating virtual resources in a three-dimensional game scene is provided. A space of the game scene is divided into multiple cuboid meshes, and newly-created resources are virtual resources rendered according to a construction instruction of a player. The method includes that: in response to the construction instruction, a current location and orientation of the virtual character are acquired, where the construction instruction includes space type information of the newly-created resources; at least one target mesh surface is determined in the plurality of cuboid meshes as a construction location of the newly-created resources according to the space type information and the current location and orientation of the (Continued)

virtual character and the newly-created resources are rendered on the at least one target mesh surface. The present disclosure solves the technical, problem of low generation efficiency of virtual resources in 3D games.

18 Claims, 5 Drawing Sheets

(56) References Cited

U.S. PATENT DOCUMENTS

| | | | | |
|---|---|---|---|---|
| 9,737,811 | B1* | 8/2017 | Penmatsa | A63F 13/35 |
| 10,726,611 | B1* | 7/2020 | Court | A63F 13/20 |
| 10,984,587 | B2* | 4/2021 | Duka | G06T 17/20 |
| 2002/0069261 | A1 | 6/2002 | Bellare et al. | |
| 2005/0153766 | A1 | 7/2005 | Harmon | |
| 2007/0035831 | A1* | 2/2007 | Gutierrez Novelo | A63F 13/52 359/465 |
| 2011/0306414 | A1* | 12/2011 | McNeely | A63F 13/2145 463/31 |
| 2014/0163930 | A1* | 6/2014 | Balon | A63F 13/60 703/1 |
| 2015/0091906 | A1* | 4/2015 | Dishno | G06F 16/954 345/427 |
| 2015/0206345 | A1* | 7/2015 | Chang | G06T 17/20 345/423 |
| 2016/0267705 | A1* | 9/2016 | O'Leary | G06T 13/20 |
| 2017/0046882 | A1 | 2/2017 | Lane et al. | |
| 2017/0053457 | A1* | 2/2017 | Thompson | A63F 13/42 |
| 2017/0061037 | A1* | 3/2017 | Makem | G06T 17/20 |
| 2018/0031719 | A1* | 2/2018 | Huang | G01V 99/005 |
| 2018/0065058 | A1* | 3/2018 | LaCrosse | G09B 5/125 |
| 2018/0068574 | A1* | 3/2018 | LaCrosse | G06T 13/20 |
| 2018/0122140 | A1* | 5/2018 | Janzer | G06T 15/40 |
| 2018/0330096 | A1* | 11/2018 | Breindel | A63F 13/358 |
| 2019/0197765 | A1* | 6/2019 | Molyneaux | G06T 15/06 |
| 2019/0240581 | A1* | 8/2019 | Walker | A63F 13/65 |

FOREIGN PATENT DOCUMENTS

| | | |
|---|---|---|
| CN | 105935493 A | 9/2016 |
| CN | 106295063 A | 1/2017 |
| CN | 106326554 A | 1/2017 |
| CN | 108211354 A | 6/2018 |

OTHER PUBLICATIONS

Guiying Sama; < [Guiying] «My World» WE WorldEdit Instruction Course and Application [minecraft] >; Jul. 1, 2017; <Bilibili website>.

* cited by examiner

METHOD AND APPARATUS FOR GENERATING VIRTUAL RESOURCES IN THREE-DIMENSIONAL GAME SCENE

TECHNICAL FIELD

The present disclosure relates to the technical field of games, and in particular to a method and apparatus for generating virtual resources in a three-dimensional game scene.

BACKGROUND

Under the wave of the Internet, continuous development and evolution of hardware and software technologies has promoted emergence of terminals and software. At the same time, a large number of games with different themes emerged to meet the needs of players. In a three-dimensional (3D) game scene, in addition to a virtual character controlled by a game player, a series of virtual resources, such as various buildings constructed by walls and boards, are further included. The virtual character in the game scene is controlled by the game player to perform general game operations such as moving, jumping, and interacting with virtual characters controlled by other players. And in addition, some games also allow players to control virtual characters to construct virtual resources in the game scene. However, in the above game, the construction of virtual resources according to instructions of players often consumes a large amount of computing resources, and the requirements for hardware devices are high. Moreover, game players need to determine the location of virtual resources through complicated operation instructions, so that the operation burden of the game players is heavier. The above problem is especially serious in mobile devices.

No effective solution has been provided yet for the above-mentioned problem.

It is to be noted that information disclosed in the Background section above is for enhancement of understanding of the background of the present disclosure, and thus may include information that does not constitute the related art known to the skilled person in the art.

SUMMARY

At least some embodiments of the present disclosure provide a method and apparatus for generating virtual resources in a three-dimensional game scene, so as at least to partially solve a technical problem of low generation efficiency of virtual resources in 3D games.

In one embodiment of the present disclosure, a method for generating virtual resources in a three-dimensional game scene is provided. The three-dimensional game scene may include at least one virtual character and virtual resources. The virtual resources may include existing resources and newly-created resources. A space of the three-dimensional game scene may be divided into multiple cuboid meshes. The newly-created resources may be part of the virtual resources rendered in response to a construction instruction input by a user. The method may include the steps as follows.

In response to the construction instruction, a current location and orientation of the virtual character are acquired, wherein the construction instruction includes space type information of the newly-created resources, and space types of the newly-created resources include at least one of the following: construction along at least one vertical plane of at least one cuboid mesh, construction along at least one horizontal plane of at least one cuboid mesh, and construction along at least one inner slope of at least one cuboid mesh.

At least one target mesh surface is determined in the multiple cuboid meshes as a construction location of the newly-created resources according to the space type information and the current location and orientation of the virtual character.

The newly-created resources are rendered on the at least one target mesh surface.

In another embodiment of the present disclosure, an apparatus for generating virtual resources in a three-dimensional game scene is provided. The three-dimensional game scene may include at least one virtual character and virtual resources. The virtual resources may include existing resources and newly-created resources. A space of the three-dimensional game scene may be divided into multiple cuboid meshes. The newly-created resources may be part of the virtual resource rendered in response to a construction instruction input by a user. The apparatus may include:

an acquisition element, configured to acquire, in response to the construction instruction, a current location and orientation of the virtual character, wherein the construction instruction includes space type information of the newly-created resources, and space types of the newly-created resources include at least one of the following: construction along at least one vertical plane of at least one cuboid mesh, construction along at least one horizontal plane of at least one cuboid mesh, and construction along at least one inner slope of at least one cuboid mesh;

a determination element, configured to determine at least one target mesh surface in the multiple cuboid meshes as a construction location of the newly-created resources according to the space type information and the current location and orientation of the virtual character; and a rendering element, configured to render the newly-created resources on the at least one target mesh surface.

In another embodiment of the present disclosure, an electronic device is further provided. The electronic device may include: at least one processor; and at least one memory, configured to store at least one executable instruction of the at least one processor, and the at least one processor is configured to perform the above method by executing the at least one executable instruction.

In another embodiment of the disclosure, a computer-readable storage medium is further provided. The computer-readable storage medium may store at least one computer program, and the at least one computer program is executed by at least one processor to implement the above method.

In at least one embodiment of the present disclosure, in response to the construction instruction, the current location and orientation of the virtual character are acquired, and the construction instruction includes space type information of the newly-created resources, and spaces type of the newly-created resources include at least one of the following: construction along at least one vertical plane of at least one cuboid mesh, construction along at least one horizontal plane of at least one cuboid mesh, and construction along at least one inner slope of at least one cuboid mesh; at least one target mesh surface is determined in the multiple cuboid meshes as the construction location of the newly-created resources according to the space type information and the current location and orientation of the virtual character; and the newly-created resources are rendered on the at least one target mesh surface. Thus, the technical problem of low generation efficiency of virtual resources in 3D games is solved.

DETAILED DESCRIPTION

In order to enable those skilled in the art to understand the solutions of the present disclosure better, the technical solutions of embodiments of the present disclosure are clearly and completely described together with the drawings of the embodiments of the present disclosure. Apparently, the described embodiments are merely a part of the embodiments of the present disclosure instead of all. On the basis of the embodiments of the present disclosure, all other embodiments obtained on the premise of no creative work of those skilled in the art fall within the protection scope of the present disclosure.

It is to be noted that the specification and claims of the present disclosure and the terms "first", "second" and the like in the drawings are used to distinguish similar objects, and do not need to describe a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

According to one embodiment of the present disclosure, a method for generating virtual resources in a three-dimensional game scene is provided. It needs to be noted that steps shown in the flow charts of the drawings may be executed in a computer system such as a group of computer executable instructions. In addition, although logic sequences are shown in the flow charts, in some situations, steps illustrated or described may be executed in sequences different from those illustrated here.

Figure 1:
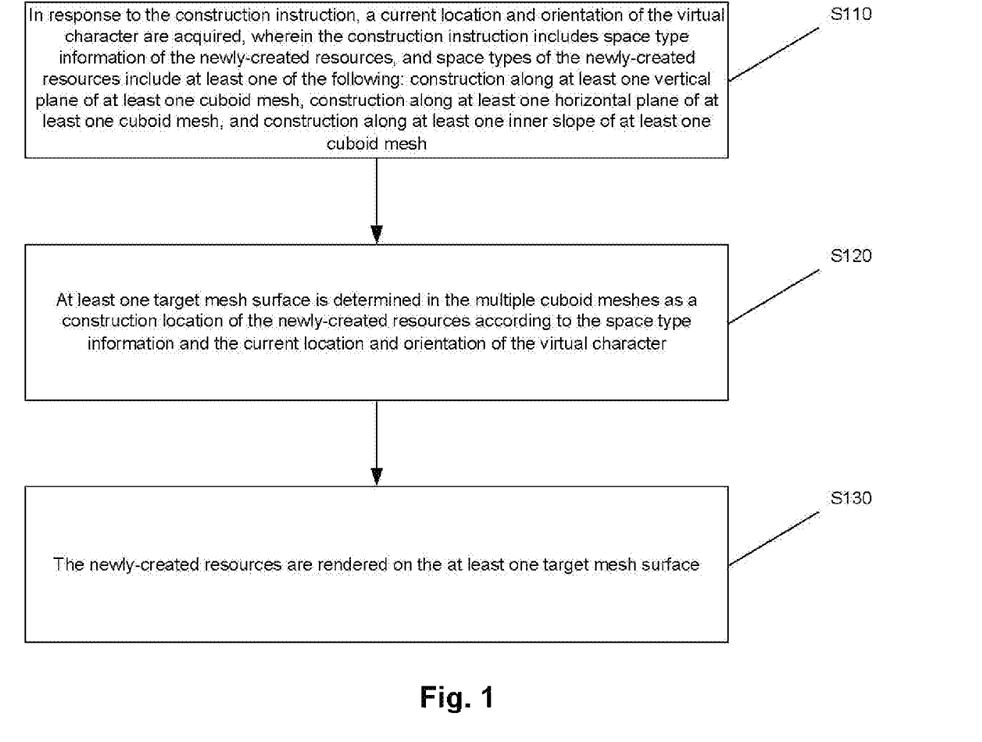
FIG. 1 is a flowchart of a method for generating virtual resources in a three-dimensional game scene according to an embodiment of the present disclosure.

FIG. 1 is a flowchart of a method for generating virtual resources in a three-dimensional game scene according to an embodiment of the present disclosure. The three-dimensional game scene may include at least one virtual character and virtual resources. The virtual resources may include existing resources and newly-created resources. A space of the three-dimensional game scene may be divided into multiple cuboid meshes. The newly-created resources may be part of the virtual resources rendered in response to a construction instruction input by a user. The method may include the steps as follows.

At step S110, in response to the construction instruction, a current location and orientation of the virtual character are acquired, wherein the construction instruction includes space type information of the newly-created resources, and space types of the newly-created resources include at least one of the following: construction along at least one vertical plane of at least one cuboid mesh, construction along at least one horizontal plane of at least one cuboid mesh, and construction along at least one inner slope of at least one cuboid mesh.

At step S120, at least one target mesh surface is determined in the multiple cuboid meshes as a construction location of the newly-created resources according to the space type information and the current location and orientation of the virtual character.

At step S130, the newly-created resources are rendered on the at least one target mesh surface.

By means of the method for generating virtual resources in the three-dimensional game scene in the present embodiment, on the one hand, since the construction location of newly-created resources is located in at least one cuboid mesh dividing the space of a game scene, the calculation amount in the process of generating the newly-created resources is greatly reduced, and the problem about the efficiency of self-constructing virtual resources by a player during the game is solved. On the other hand, in the process of controlling the virtual character to generate the virtual resources by the player, the construction location of the virtual resources can be determined directly, quickly and conveniently according to the location and orientation of the virtual character, which greatly reduces the operational burden of the player.

Each step of the method for generating virtual resources in the present exemplary embodiment will be further described below.

The multiple cuboid meshes are used for conveniently determining the construction location of the newly-created virtual resources. And the space of the game scene is divided into multiple cuboid subspaces of the same size. That is, the meshes are space dividing boundaries of the game scene, and are not entities in the game. The multiple cuboid meshes may be cubes with the same length, width and height, or cuboids with not completely the same length, width and height. The following embodiments are described by taking at least one cuboid mesh of which the length and width are the same and the height is different from the length and width as an example. For example, a cuboid mesh has a length and width of 5 meters and a height of 3.5 meters.

At step S110, in response to the construction instruction, a current location and orientation of the virtual character are acquired, wherein the construction instruction includes space type information of the newly-created resources, and space types of the newly-created resources include at least one of the following: construction along at least one vertical plane of at least one cuboid mesh, construction along at least one horizontal plane of at least one cuboid mesh, and construction along at least one inner slope of at least one cuboid mesh.

Figure 2:
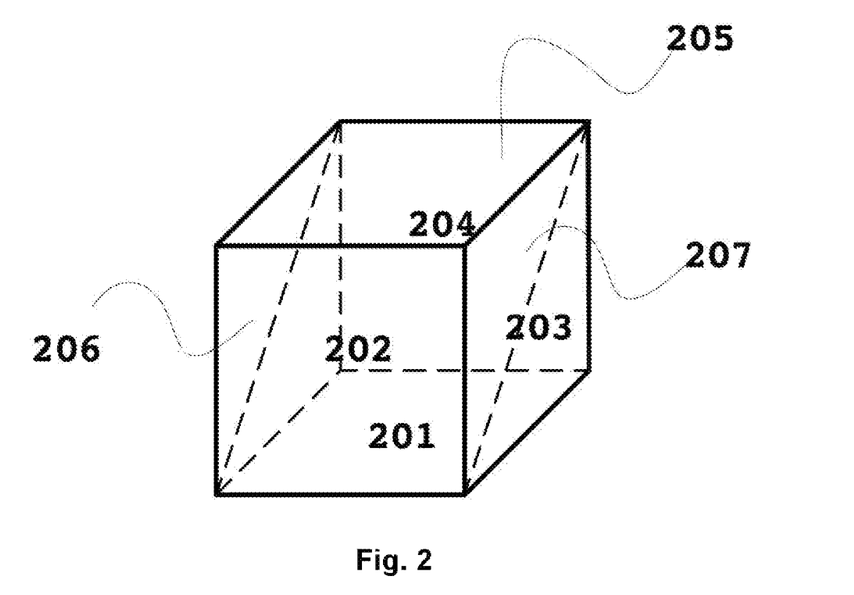
FIG. 2 is a schematic stereogram of at least one cuboid mesh in an exemplary embodiment of the present disclosure.

The construction of the newly-created resources (i.e., rendered in a game screen) is triggered by a construction instruction of a player. And the construction instruction at least includes space types of virtual resources (i.e., the newly-created resources) intended to be constructed by the player, and may further include material attributes (such as wood, concrete, or bricks) and quantity of the newly-created resources. The space types of the newly-created resources are geometric locations of the newly-created resources relative to the cuboid mesh. The space types may be construction along at least one vertical plane of the at least one cuboid mesh, construction along at least one horizontal plane of the at least one cuboid mesh, and construction along at least one inner slope of the at least one cuboid mesh surface. The vertical plane is each of four planes perpendicular to a ground plane of the game scene in the at least one cuboid mesh. The horizontal plane is each of two planes parallel to the ground plane of the game scene in the at least one cuboid mesh. The inner slope is a diagonal section in the at least one cuboid mesh and a plane where the diagonal section located passes through a side of one horizontal plane and a side of another horizontal plane of each cuboid mesh and intersects with the two vertical planes of this cuboid mesh. Taking the material property of the newly-created resources being a brick as an example, the newly-created resource constructed along the vertical plane of the at least one cuboid mesh is a vertical wall, the newly-created resource horizontally constructed along the at least one cuboid mesh is a horizontal wall, and the newly-created resource constructed along the construction location namely the inner slope of the at least one cuboid mesh is an upward or downward slope. FIG. 2 is a schematic diagram of a cuboid mesh. Mesh surfaces 202, 203, 204, and 206 are vertical mesh surfaces, mesh surfaces 201 and 205 are horizontal mesh surfaces, and a mesh surface 207 is one of the inner slopes.

At step S120, at least one target mesh surface is determined in the multiple cuboid meshes as a construction location of the newly-created resources according to the space type information and the current location and orientation of the virtual character.

The space types of the newly-created resources are used for determining a geometric location of the newly-created resources relative to the at least one cuboid mesh, rather than determining an absolute location of the newly-created resources in the game scene. Determining the construction location of the newly-created resources requires determining a specific location of at least one cuboid mesh surface where the newly-created resources are located. In order to acquire the construction location of the newly-created resources, it is also necessary to obtain the current location and orientation of the virtual character in the game scene, so as to determine at least one target mesh surface (i.e., at least one specific surface of at least one specific cuboid mesh of the newly-created resources) in the multiple cuboid meshes as the construction location of the newly-created resources according to the space type information and the current location and orientation of the virtual character. In a 3D game of a first person perspective or a third person perspective, the orientation of the virtual character controlled by the player is generally the same as an orientation of a virtual camera in the game. In order to enable the player to generate newly-created resources in front of the virtual character controlled by the player when issuing the construction instruction, the at least one target mesh surface is selected, according to the space types of the newly-created resources, from the at least one cuboid mesh surface near the virtual character and within the field of view of the virtual character. The specific method of determination will be detailed in the embodiments below.

At step S130, the newly-created resources are rendered on the at least one target mesh surface.

After the at least one target mesh surface is determined through steps S110 and S120, the newly-created resources are rendered on the at least one target mesh surface, thereby completing the construction of the newly-created resources according to the construction instruction of the player.

In an optional embodiment, the space types of the existing resources include: construction along at least one vertical plane of at least one cuboid mesh, construction along at least one horizontal plane of at least one cuboid mesh, and construction along at least one inner slope of at least one cuboid mesh. In the present embodiment, the space types of the existing virtual resources (i.e., the existing resources) in the game are the same as the space types of the newly-created resources. And the existing virtual resources are also rendered along the at least one vertical plane, the at least one horizontal plane, or the at least one inner slope of the at least one cuboid mesh. Since the newly-created resources have the same space types as the existing resources, it is easier to match the existing resources when generating the newly-created resources, which also greatly reduces the calculation amount and improves the running efficiency of the game.

In an optional embodiment, the at least one target mesh surface is at least one cuboid mesh surface. The construction instruction may further include the number of newly-created resources. When the player determines to generate multiple newly-created resources in the construction instruction, there may be multiple cuboid mesh surfaces on which the newly-created resources are constructed. For example, if the player intends to construct a vertical wall with a height of 5 meters (relative to the ground plane of the game scene) and a length of 15 meters, it is necessary to produce newly-created resources on the vertical plane of three consecutive cuboid meshes. That is, the at least one target mesh surface is three cuboid mesh surfaces.

In an optional embodiment, the step of rendering the newly-created resources on the at least one target mesh surface includes that: preview information of the newly-created resources is rendered on the at least one target mesh surface; and in response to a confirmation instruction input by the user according to the preview information, the newly-created resources are rendered on the at least one target mesh surface. Before the newly-created resources are rendered on the at least one target mesh surface, the preview information of the newly-created resources is first rendered on the at least one target mesh surface, and the newly-created resources are rendered on the at least one target mesh surface after receiving confirmation information sent by the player. On the one hand, a game system automatically determines the construction location of the newly-created resources according to the current location and orientation of the virtual character controlled by the player, which reduces the operational burden of the player. On the other hand, it may also provide the player with the opportunity to modify the construction location of the newly-created resources. That is, when the player finds that the construction location of the newly-created resources automatically determined by the system is not the desired construction location, the construction may be abandoned, and another construction instruction is issued to select other construction locations.

In another embodiment of the present disclosure, when the spaces type of the newly-created resources are construction along at least one vertical plane of at least one cuboid mesh, the step of determining the at least one target mesh surface in the multiple cuboid meshes as the construction location of the newly-created resources according to the space types of the newly-created resources and the current location and orientation of the virtual character includes the steps as follows.

At step S210, a current mesh of the virtual character and a first location of the virtual character in the current mesh are calculated according to the current location of the virtual character.

At step S220, a second location of a candidate mesh surface of the construction location in a horizontal reference plane is determined according to the current mesh and the first location, and the horizontal reference plane is parallel to a ground plane of the three-dimensional game scene.

At step S230, a third location of the at least one target mesh surface in the horizontal reference plane is determined from the second location according to a projection of the orientation of the virtual character in the horizontal reference plane.

At step S240, a fourth location of the at least one target mesh surface in a vertical direction is determined according to the current location and orientation of the virtual character and the third location, and the vertical direction is perpendicular to the ground plane of the three-dimensional game scene.

At step S250, the construction location is obtained according to the third location and the fourth location.

In order to facilitate determination of a space location, a three-dimensional coordinate system XYZ may be established in the game scene. A XZ plane formed by an X axis and a Z axis is parallel to the ground plane of the game scene (i.e., the above horizontal reference plane, coordinate X and coordinate Z together determine a location in the horizontal reference plane), and a Z axis is perpendicular to the ground plane of the game scene (i.e., the location in the above vertical direction is the coordinate on the Z axis). The current location of the virtual character in the game scene described at step S210 may be determined by coordinates of the virtual character in the coordinate system. And the location of each cuboid mesh is also determined by corresponding coordinates in the game scene. The relative location of the virtual character in the mesh at step S210 refers to the space location of the virtual character with a mesh in which the virtual character is located as a reference system.

Figure 3:
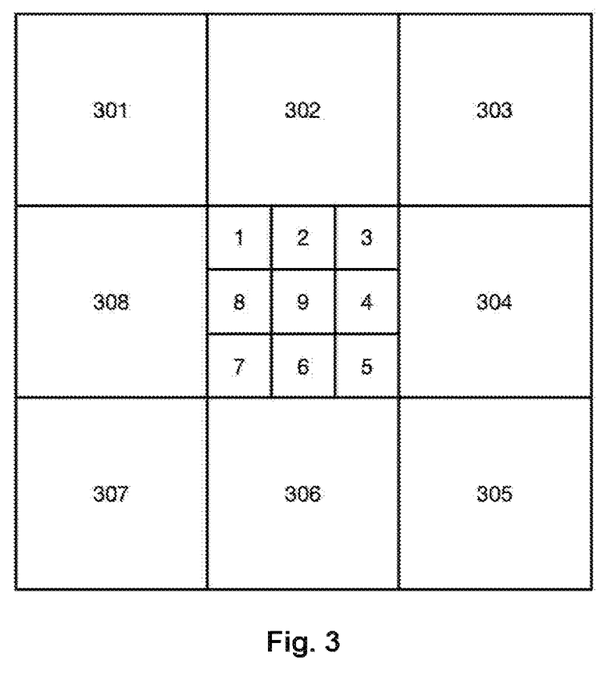
FIG. 3 is a schematic diagram of determining a location of a vertical candidate mesh surface in a horizontal reference plane in an exemplary embodiment of the present disclosure.

According to an exemplary embodiment as shown in FIG. 3, the step S220 of determining, according to the current mesh and the relative location, the second location of the candidate mesh surface of the construction location in the horizontal reference plane includes that: in a top view (i.e., in the horizontal reference plane), a current mesh (i.e., a large square in the middle, and eight large squares around the large square in the middle representing meshes adjacent to the current mesh of the virtual character) of the virtual character is equally divided into nine small squares. And when the virtual character is located in the middle small square 9, four vertical planes corresponding to the four sides of the large square in the middle are used as candidate mesh surfaces of the construction location of the newly-created resources. When the virtual character is located in four small squares 2, 4, 6, and 8 near the midpoint of the four sides of the large square in the middle, six vertical planes (appearing to be six peripheral sides of two large squares arranged in a shape like a Chinese character "Ri" on the top view) not shared by the large square in the middle and a mesh adjacent to the current small square of the virtual character are used as candidate mesh surfaces of the construction location of the newly-created resources. and When the virtual character is located in four small squares 1, 3, 5, and 7 near the four corners of the large square in the middle, eight vertical planes (appearing to be eight peripheral sides of four large squares arranged in a shape like a Chinese character "Tian" on the top view) not shared by the large square in the middle and three meshes adjacent to the current small square of the virtual character are used as candidate mesh surfaces of the construction location of the newly-created resources. For example, when the virtual character is in the mesh represented by the small square 2, meshes represented by the large square in the middle and six square sides on the periphery of the large square 302 are taken as candidate meshes. And when the virtual character is in the mesh represented by the small square 1, meshes represented by the large square in the middle and eight square sides on the periphery of the large squares 301, 302 and 308 are taken as candidate meshes.

Through the above method, mesh surfaces within an appropriate distance range near the virtual character can be determined as candidate mesh surfaces of the newly-created resources. The appropriate distance is greater than 1/3 of the square side length of the mesh surface, and smaller than 4/3 of the square side length of the mesh surface. Of course, the above appropriate distance may also be adjusted according to factors such as the relative size of the virtual character and the mesh. The method for determining the relative location of the virtual character in the mesh is not limited to the above-mentioned nine-square mesh determination method. There may be other methods of, for example, determining whether the distance between the virtual character and the four surfaces of the current mesh is within a predetermined threshold range.

In an optional embodiment, step S230 of determining the third location of the at least one target mesh surface in the horizontal reference plane from the second location according to the projection of the orientation of the virtual character in the horizontal reference plane includes that: a projection of a ray with the location of the virtual character as an origin and the orientation of the virtual character as a direction in the horizontal reference plane is acquired, the at least one candidate mesh surface intersecting with the projection in the horizontal reference plane is the at least one target mesh surface, and the location of the at least one target mesh surface in the horizontal reference plane is the third location. That is, the third location is determined from the multiple second location obtained in step S220, thereby obtaining the location of the at least one target mesh surface in the horizontal reference plane. From the top view, it can also be seen as being continuous from the location of the virtual character to the endpoints of the respective square sides representing the at least one candidate mesh surface, the connecting line divides the 360-degree area around the virtual character into sub-angle areas with the same number as the candidate mesh surfaces. A specific sub-angle area where the line of sight of the virtual character (that is, a ray with the location of the virtual character as an origin and the orientation of the virtual character as a direction) is located is determined, and then the at least one candidate mesh surface corresponding to the sub-angle area where the line of sight is located is used as the at least one target mesh surface.

Figure 4:
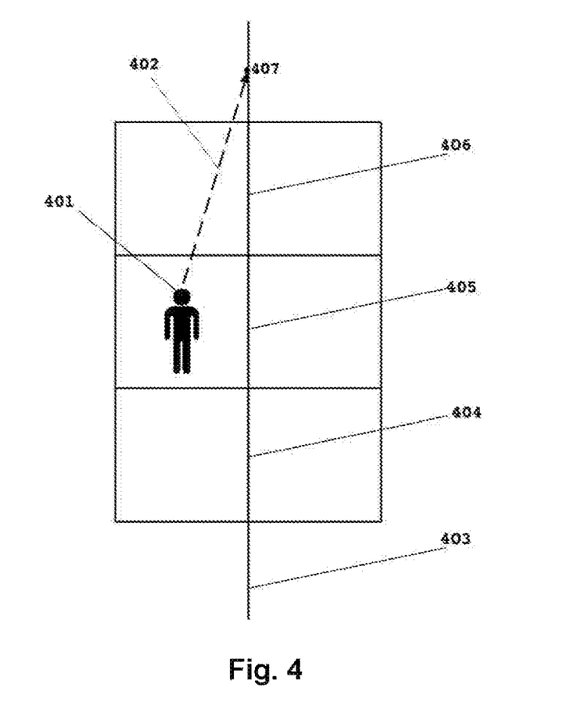
FIG. 4 is a schematic diagram of determining a location of a vertical target mesh surface in a vertical direction in an exemplary embodiment of the present disclosure.

After obtaining the location of the at least one target mesh surface in the horizontal reference plane by the above steps, it is also necessary to determine the location of the at least one target mesh surface in the vertical direction. According to an exemplary embodiment as shown in FIG. 4, in an optional embodiment, step S240 of determining the fourth location of the at least one target mesh surface in the vertical direction according to the current location and orientation of the virtual character and the third location includes that: the candidate location of the at least one target mesh surface in the vertical direction includes high, middle and low locations (i.e., mesh surfaces 406, 405 and 404 in FIG. 4), the location of the middle candidate mesh surface 405 in the vertical direction is the same as the location of the mesh of the virtual character 401 (i.e., the Z coordinate is the same). The location of the high candidate mesh surface 406 in the vertical direction is higher than the location of the mesh of the virtual character 401. And the location of the low candidate mesh surface 404 in the vertical direction is lower than the location of the mesh of the virtual character 401. An intersection 407 of the line of sight 402 of the virtual character with a plane where the at least one candidate mesh surface is located is acquired. A distance between a midpoint of each of the high candidate mesh surface, the middle candidate mesh surface and the low candidate mesh surface and the intersection 407 is calculated; and one candidate mesh surface having the shortest distance between the midpoint and the intersection 407 is used as a selected target mesh surface. As shown in FIG. 4, the midpoint of the high candidate mesh surface 406 is closest to the intersection 407, and the high candidate mesh surface 406 is determined as the selected target mesh surface.

In an optional embodiment, in order to avoid too far location of the intersection due to the fact that the angle between the virtual character and the plane where the at least one candidate mesh surface is located is too small (i.e., an absolute value of a pitch angle of the line of sight of the virtual character is close to 90 degrees), the absolute value of the pitch angle of the virtual character may be limited within 80 degrees, but it may also be set to other angles as needed.

In an optional embodiment, in order to avoid that the selected target mesh surface may not construct newly-created resources (such as neither connected with the game scene nor connected with other virtual resources), it may be first determined whether the selected target mesh surface may construct newly-created resources. When the newly-created resources may not be constructed, one of mesh surfaces adjacent to the selected target mesh surface determined previously is continuously selected from two other mesh surfaces among three candidate mesh surfaces in the vertical direction. And it is determined whether the newly-created resources may be constructed. When the second target mesh surface may construct the newly-created resources, it is determined as a final target mesh surface. And when the second target mesh surface may not construct the newly-created resources, the player is prompted that the newly-created resources may not be constructed at the current location.

In step S250, the construction location may be determined in three-dimensional coordinates of the three-dimensional game scene according to the third location of the at least one target mesh surface, acquired in step S230, in the horizontal reference plane and the fourth location of the at least one target mesh surface, acquired in step S240, in the vertical direction.

In another optional embodiment of the present disclosure, when the space types of the newly-created resources are construction along the at least one horizontal plane of at least one cuboid mesh, the step of determining the at least one target mesh surface in the multiple cuboid meshes as the construction location according to the space types of the newly-created resources and the current location and orientation of the virtual character includes the steps as follows.

At step S310, a current mesh of the virtual character is calculated according to the current location of the virtual character.

At step S320, a first location of the at least one target mesh surface in a vertical direction is determined according to the orientation of the virtual character and the current mesh, and the vertical direction is perpendicular to a ground plane of the three-dimensional game scene.

At step S330, a second location of the at least one target mesh surface in a horizontal reference plane is determined according to the current location and orientation of the virtual character, the current mesh and the first location, and the horizontal reference plane is parallel to the ground plane of the game scene.

At S340, the construction location is obtained according to the first location and the second location.

When the space types of the newly-created resources are construction along the at least one horizontal plane of the at least one cuboid mesh, for example, at least one horizontal wall surface parallel to the ground plane of the game scene, the at least one target mesh surface is also at least one horizontal plane in the current mesh of the virtual character and the adjacent mesh, so it is also necessary to first calculate the current mesh of the virtual character according to the current location of the virtual character.

Figure 5:
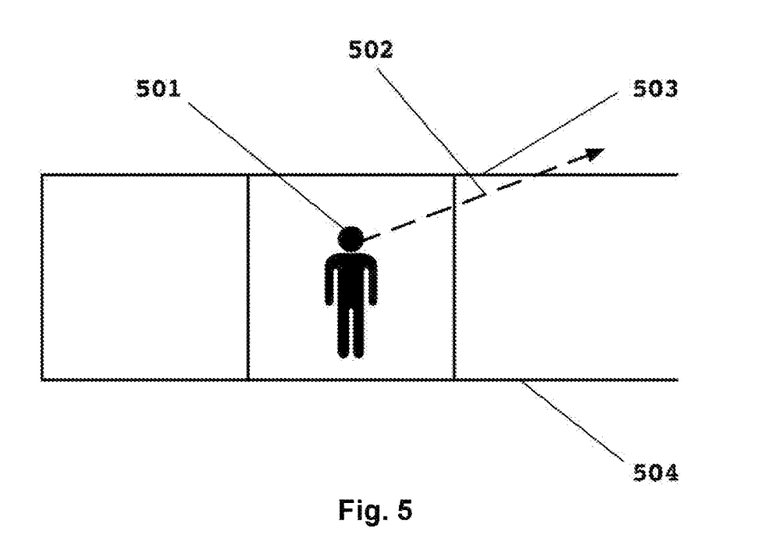
FIG. 5 is a schematic diagram of determining a plane where a horizontal target mesh surface is located according to an orientation of a virtual character in an exemplary embodiment of the present disclosure.

At step S320, the first location of the at least one target mesh surface in the vertical direction is determined. That is, the plane where the at least one target mesh surface of the newly-created resources is located is determined. The plane where the at least one target mesh surface of the newly-created resources is located is selected from planes of an upper horizontal plane and a lower horizontal plane of the mesh where the virtual character is located. In an optional embodiment, the selection method may be as follows. The pitch angle of the line of sight of the virtual character is determined. When the pitch angle is greater than zero (i.e., the virtual character is viewed from the bottom), at least one horizontal plane with an upward location in the vertical direction is selected (such as plane 503 in FIG. 4). And when the pitch angle is less than zero (i.e., the virtual character is viewed from the top), at least one horizontal plane with a downward location in the vertical direction is selected (such as plane 504 in FIG. 4). As shown in FIG. 5, when the pitch angle of the line of sight 502 of the virtual character 501 is greater than zero, the horizontal plane 503 with an upward location in the mesh, where the virtual character is located, is determined as the plane where the at least one target mesh surface is located.

In an optional embodiment, in order to avoid the intersection approaching infinity when the pitch angle of the virtual character approaches zero, the pitch angle between 0 and 5 degrees may be set to 5 degrees, and the pitch angle between −5 degrees and 0 degrees is set to −5 degrees. Of course, it may also be set to other angles as needed.

Figure 6:
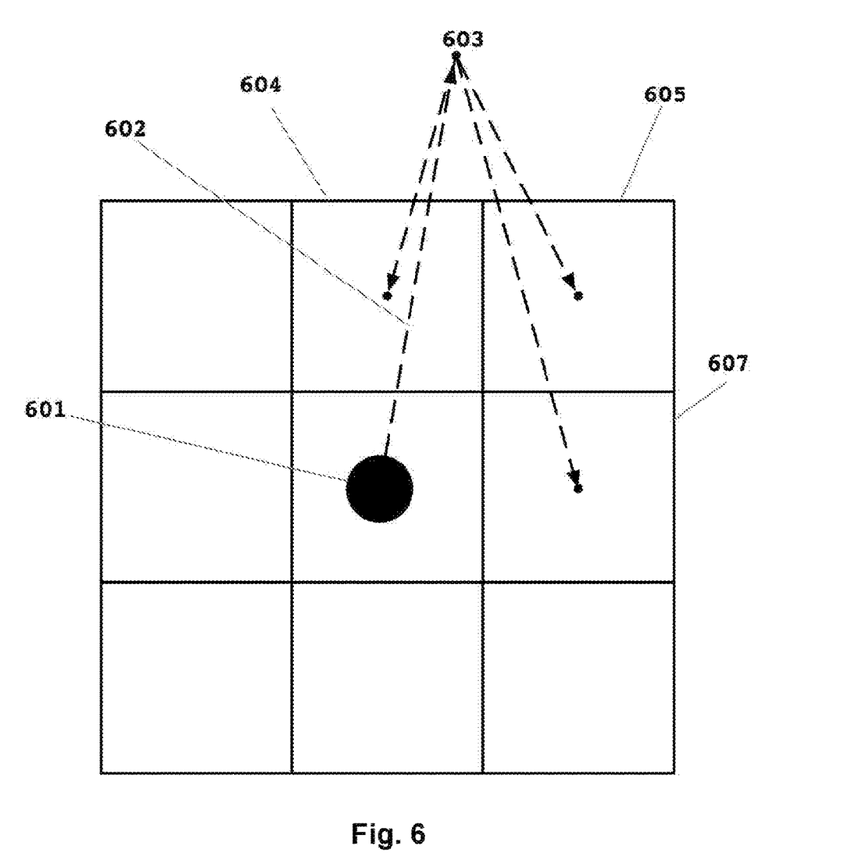
FIG. 6 is a schematic diagram of determining a location of a horizontal target mesh surface in a horizontal reference plane in an exemplary embodiment of the present disclosure.

At step S330, the location of the at least one target mesh surface in the horizontal reference plane is the same as the location of the at least one target mesh surface in the plane since the planes of the horizontal reference plane and the at least one target mesh surface are parallel to the ground plane of the game scene (that is, the coordinates X and Z of the two are the same). As shown in FIG. 6, in an optional embodiment, the step of determining the location of the at least one target mesh surface in the horizontal reference plane may be that: an intersection 603 between a line of sight 602 of a virtual character 601 and a plane where the at least one target mesh surface is located is calculated; a distance between the intersection 603 and a midpoint of each mesh surface of the current mesh of the virtual character 601 and at least one mesh adjacent to the current mesh in the plane where the at least one target mesh surface is located is calculated; and a mesh surface (i.e., a mesh surface 604 in FIG. 6) having the midpoint closest to the intersection is selected as a selected mesh surface.

In an optional embodiment, before calculating distance between the intersection 603 and a midpoint of each mesh surface of the current mesh of the virtual character 601 and at least one mesh adjacent to the current mesh in the plane where the at least one target mesh surface is located, three mesh surfaces may be selected as candidate mesh surfaces from meshes adjacent to the current mesh of the virtual character according to the orientation of the virtual character in the plane where the at least one target mesh surface is located. For example, when the orientation of the virtual character is the northeast direction, three mesh surfaces in the northeast direction (604, 605, and 607 in FIG. 6) are selected as candidate mesh surfaces.

In one optional embodiment of the present disclosure, when the space types of the newly-created resources are construction along at least one inner slope of at least one cuboid mesh, the step of determining at least one target mesh surface in the multiple cuboid meshes as the construction location according to the space types of the newly-created resources and the current location and orientation of the virtual character includes the steps as follows.

At step S410, an extending direction of the at least one target mesh surface in a horizontal reference plane is determined according to a projection of the orientation of the virtual character in the horizontal reference plane, and the horizontal reference plane is parallel to a ground plane of the three-dimensional game scene.

At step S420, a current mesh of the virtual character and a first location of the virtual character in the current mesh are calculated according to the current location of the virtual character.

At step S430, a second location of the at least one target mesh surface in the horizontal reference plane is determined according to the orientation of the virtual character, the current mesh and the first location.

At step S440, a third location of the at least one target mesh surface in a vertical direction is determined according to the orientation of the virtual character and the current mesh, and the vertical direction is perpendicular to the ground plane of the three-dimensional game scene.

At step S450, the construction location is obtained according to the second location and the third location.

For the construction location of the newly-created resources (such as a ladder or a slope) constructed along the at least one inner slope of the at least one cuboid mesh, in addition to determining the location on the horizontal reference plane and the location in the vertical direction, it is also necessary to determine the extending direction of the at least one target mesh surface in the horizontal reference plane.

Figure 7:
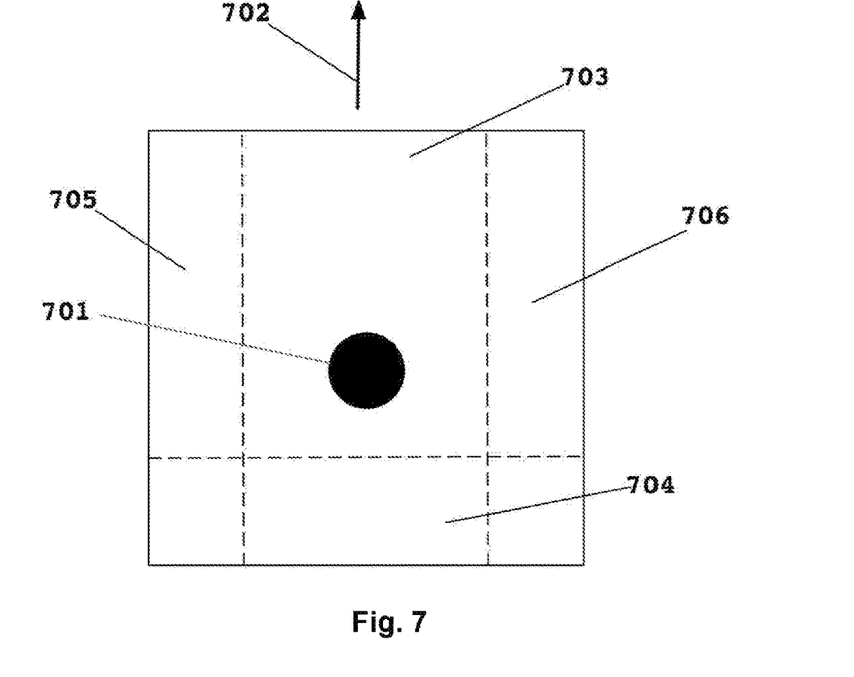
FIG. 7 is a schematic diagram of determining a location of a target mesh surface in a type of at least one inner slope in a horizontal reference plane in an exemplary embodiment of the present disclosure.

As shown in FIG. 7, in an optional embodiment, the first location in the current mesh at step S420 may be within the horizontal reference plane, and the current mesh is divided into a front part and a rear part in the extending direction 702 of the at least one target mesh surface. The front part 703 occupies 70% on the horizontal reference plane, and the rear part 704 occupies 30% on the horizontal reference plane. The current mesh is divided into a left part, a middle part and a right part (such as 705, 704 and 706 in FIG. 4) in the direction perpendicular to the extending direction, which occupy 30%, 40% and 30% respectively on the horizontal reference plane. For convenience of discussion, the extending direction of the at least one target mesh surface is expressed as the front direction, the opposite direction is the rear direction, and the direction perpendicular to the extending direction of the at least one target mesh surface is divided into left and right sides.

In an optional embodiment, step S430 of determining the second location of the at least one target mesh surface in the horizontal reference plane includes that: on the basis of the location of the current mesh in the horizontal reference plane, it is determined whether forward and backward offsets (offset by one mesh) are performed according to the relative location of the virtual character 701 in the current mesh and the orientation (i.e., the line of sight of the virtual character) of the virtual character 701, so as to determine the location of the at least one target mesh surface in the horizontal reference plane. When the virtual character 701 is located at the left part and the line of sight is offset leftward by over 15 degrees, it is offset leftward by one mesh. When the virtual character 701 is located at the right part and the line of sight is offset rightward by over 15 degrees, it is offset rightward by one mesh. And in other cases, leftward and rightward offsets are not required. When the virtual character 701 is located at the front part and an absolute value of the pitch angle of the line of sight is less than 30 degrees, it is offset forward by one mesh. When the virtual character 701 is located at the rear part or the virtual character 701 is located at the front part and an absolute value of the pitch angle of the line of sight is greater than 30 degrees, forward and backward offsets are not required.

In an optional embodiment, step S440 of determining the third location of the at least one target mesh surface in the vertical direction includes that: on the basis of the location of the current mesh in the vertical direction, it is determined whether upward and downward offsets (offset by one mesh) are performed according to the orientation (i.e., the line of sight of the virtual character) of the virtual character, so as to determine the location of the at least one target mesh surface in the vertical direction. When the pitch angle of the line of sight of the virtual character is greater than 30 degrees, it is offset upward by one mesh. When the pitch angle of the line of sight of the virtual character is less than −30 degrees, it is offset downward by one mesh. And in other cases, upward and downward offsets are not required.

In an optional embodiment, the construction instruction includes an extending direction of the newly-created resources in a vertical direction. When the extending direction is upward, the current location of the virtual character is a current location of the head of the virtual character. And when the extending direction is downward, the current location of the virtual character is a current location of foots of the virtual character. For example, when the player determines that the newly-created resources are an upwardly extending ladder, the current location of the head of the virtual character is used as the current location of the virtual character for determining the at least one target mesh surface. And when the player determines that the newly-created resources are a downwardly extending slope, the current location of foots of the virtual character is used as the current location of the virtual character for determining the at least one target mesh surface.

If the at least one target mesh surface determined by the above method may not construct newly-created resources (for example, there is already a ladder or a slope), the location of the at least one mesh where the at least one target mesh surface is located may be offset. In an optional embodiment, if the at least one target mesh surface may not construct the newly-created resources, the location of at least one target mesh is offset forward by one mesh. If upward and downward offsets are not performed when the location of the at least one target mesh is determined, it is offset upward by one mesh. And if upward and downward offsets have been performed when the location of the at least one target mesh is determined, the upward and downward offsets are canceled, so that the height of the at least one target mesh is the same as the height of the mesh where the virtual character is located.

Figure 8:
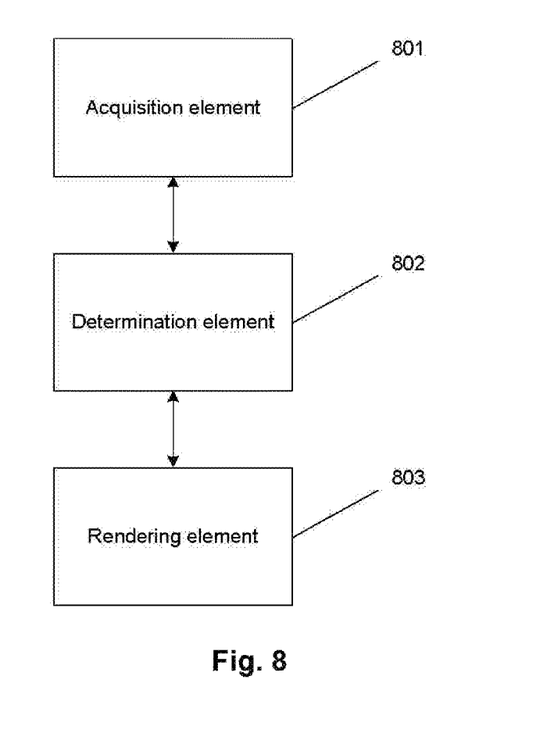
FIG. 8 is a structural block diagram of an apparatus for generating virtual resources in an exemplary embodiment of the present disclosure.

In another embodiment of the present disclosure, an apparatus for generating virtual resources in a three-dimensional game scene is also provided. The three-dimensional game scene includes at least one virtual character and virtual resources. The virtual resources include existing resources and newly-created resources. A space of the three-dimensional game scene may be divided into multiple cuboid meshes. The newly-created resources may be part of the virtual resource rendered in response to a construction instruction input by a user. The apparatus may include an acquisition element, a determination element and a rendering element.

The acquisition element is configured to acquire, in response to the construction instruction, a current location and orientation of the virtual character, wherein the construction instruction includes space type information of the newly-created resources, and space types of the newly-created resources include at least one of the following: construction along at least one vertical plane of at least one cuboid mesh, construction along at least one horizontal plane of at least one cuboid mesh, and construction along at least one inner slope of at least one cuboid mesh.

The determination element is configured to determine at least one target mesh surface in the multiple cuboid meshes as a construction location of the newly-created resources according to the space type information and the current location and orientation of the virtual character.

The rendering element is configured to render the newly-created resources on the at least one target mesh surface.

Figure 9:
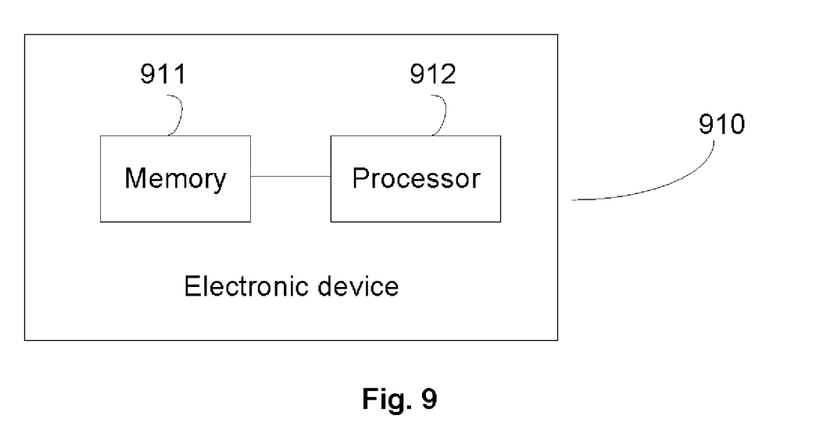
FIG. 9 is a structural block diagram of an electronic device in an exemplary embodiment of the present disclosure.
Figure 10:
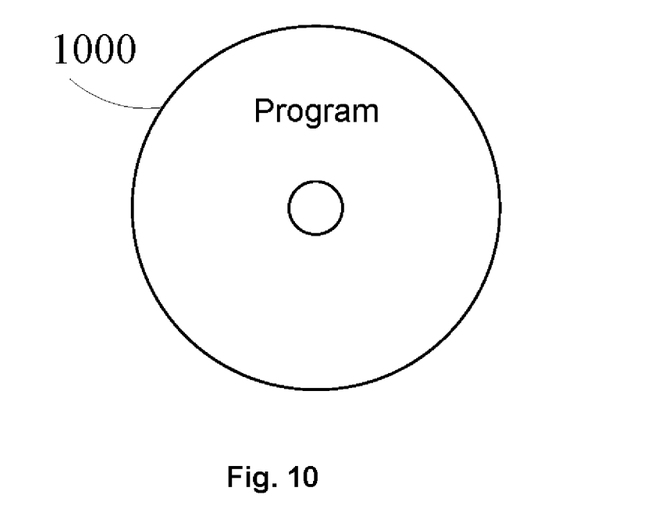
FIG. 10 is a schematic diagram of a computer-readable storage medium in an exemplary embodiment of the present disclosure.

In another embodiment of the present disclosure, an electronic device is also provided. The electronic device includes: a processing component, which may further include at least one processor, and a memory resource represented by a memory and configured to store an instruction executable by the processing component, such as an application program. The application program stored in the memory may include one or more components each corresponding to a set of instructions. In addition, the processing component is configured to execute instructions to perform the above-described method for generating virtual resources.

In an optional embodiment, the electronic device includes: at least one processor; and at least one memory, configured to store at least one executable instruction of the at least one processor, and the at least one processor is configured to perform the following steps by executing the at least one executable instruction.

In response to the construction instruction, a current location and orientation of the virtual character are acquired, wherein the construction instruction includes space type information of the newly-created resources, and space types of the newly-created resources include at least one of the following: construction along at least one vertical plane of at least one cuboid mesh, construction along at least one horizontal plane of at least one cuboid mesh, and construction along at least one inner slope of at least one cuboid mesh.

At least one target mesh surface is determined in the multiple cuboid meshes as a construction location of the newly-created resources according to the space type information and the current location and orientation of the virtual character.

The newly-created resources are rendered on the at least one target mesh surface.

Optionally, space types of the existing resources comprises at least one of the following: construction along at least one vertical plane of at least one cuboid mesh, construction along at least one horizontal plane of at least one cuboid mesh, and construction along at least one inner slope of at least one cuboid mesh.

Optionally, the at least one target mesh surface is at least one cuboid mesh surface.

Optionally, the step of rendering the newly-created resources on the at least one target mesh surface includes that:

rendering preview information of the newly-created resources on the at least one target mesh surface; and rendering, in response to a confirmation instruction input by the user according to the preview information, the newly-created resources on the at least one target mesh surface.

Optionally, when space types of the newly-created resources are construction along at least one vertical plane of at least one cuboid mesh, the step of determining the at least one target mesh surface in the multiple cuboid meshes as the construction location according to space types of the newly-created resources and the current location and orientation of the virtual character includes that:

calculating a current mesh of the virtual character and a first location of the virtual character in the current mesh according to the current location of the virtual character;

determining a second location of a candidate mesh surface of the construction location in a horizontal reference plane according to the current mesh and the first location, wherein the horizontal reference plane is parallel to a ground plane of the three-dimensional game scene;

determining a third location of the at least one target mesh surface in the horizontal reference plane from the second location according to a projection of the orientation of the virtual character in the horizontal reference plane;

determining a fourth location of the at least one target mesh surface in a vertical direction according to the current location and orientation of the virtual character and the third location, wherein the vertical direction is perpendicular to the ground plane of the three-dimensional game scene; and obtaining the construction location according to the third location and the fourth location.

Optionally, when space types of the newly-created resources are construction along at least one horizontal plane of at least one cuboid mesh, the step of determining the at least one target mesh surface in the multiple cuboid meshes as the construction location according to the spaces type of the newly-created resources and the current location and orientation of the virtual character includes that:

calculating a current mesh of the virtual character according to the current location of the virtual character;

determining a first location of the at least one target mesh surface in a vertical direction according to the orientation of the virtual character and the current mesh, wherein the vertical direction is perpendicular to a ground plane of the three-dimensional game scene;

determining a second location of the at least one target mesh surface in a horizontal reference plane according to the current location and orientation of the virtual character, the current mesh and the first location, wherein the horizontal reference plane is parallel to the ground plane of the three-dimensional game scene; and obtaining the construction location according to the first location and the second location.

Optionally, when spaces type of the newly-created resources are construction along at least one inner slope of at least one cuboid mesh, the step of determining the at least one target mesh surface in the multiple cuboid meshes as the construction location according to the space types of the newly-created resources and the current location and orientation of the virtual character includes that:

determining an extending direction of the at least one target mesh surface in a horizontal reference plane according to a projection of the orientation of the virtual character in the horizontal reference plane, wherein the horizontal reference plane is parallel to a ground plane of the three-dimensional game scene;

calculating a current mesh of the virtual character and a first location of the virtual character in the current mesh according to the current location of the virtual character;

determining a second location of the at least one target mesh surface in the horizontal reference plane according to the orientation of the virtual character, the current mesh and the first location;

determining a third location of the at least one target mesh surface in a vertical direction according to the orientation of the virtual character and the current mesh, wherein the vertical direction is perpendicular to the ground plane of the three-dimensional game scene; and obtaining the construction location according to the second location and the third location.

Optionally, the construction instruction comprises an extending direction of the newly-created resources in a vertical direction; when the extending direction is vertically upward, the current location of the virtual character is a current location of a head of the virtual character; and when the extending direction is vertically downward, the current location of the virtual character is a current location of foots of the virtual character.

The electronic device may also include: a power supply component, configured to perform power management on the electronic device; a wired or wireless network interface, configured to connect the electronic device to a network; and an input output (I/O) interface. The electronic device may operate based on an operating system stored in the memory, such as Android, iOS, Windows, Mac OS X, Unix, Linux, FreeBSD, or the like.

In another embodiment of the present disclosure, a computer-readable storage medium is further provided. The computer-readable storage medium may store a program product capable of implementing the above method of the present specification. In some possible implementation manners, various aspects of the present disclosure may also be implemented in the form of a program product, which includes a program code for causing a terminal device to execute the following steps when the program product runs on a terminal device.

In response to the construction instruction, a current location and orientation of the virtual character are acquired, wherein the construction instruction includes space type information of the newly-created resources, and space types of the newly-created resources include at least one of the following: construction along at least one vertical plane of at least one cuboid mesh, construction along at least one horizontal plane of at least one cuboid mesh, and construction along at least one inner slope of at least one cuboid mesh.

At least one target mesh surface is determined in the multiple cuboid meshes as a construction location of the newly-created resources according to the space type information and the current location and orientation of the virtual character.

The newly-created resources are rendered on the at least one target mesh surface.

Optionally, space types of the existing resources comprises at least one of the following: construction along at least one vertical plane of at least one cuboid mesh, construction along at least one horizontal plane of at least one cuboid mesh, and construction along at least one inner slope of at least one cuboid mesh.

Optionally, the at least one target mesh surface is at least one cuboid mesh surface.

Optionally, the step of rendering the newly-created resources on the at least one target mesh surface includes that:

rendering preview information of the newly-created resources on the at least one target mesh surface; and rendering, in response to a confirmation instruction input by the user according to the preview information, the newly-created resources on the at least one target mesh surface.

Optionally, when space types of the newly-created resources are construction along at least one vertical plane of at least one cuboid mesh, the step of determining the at least one target mesh surface in the multiple cuboid meshes as the construction location according to space types of the newly-created resources and the current location and orientation of the virtual character includes that:

calculating a current mesh of the virtual character and a first location of the virtual character in the current mesh according to the current location of the virtual character;

determining a second location of a candidate mesh surface of the construction location in a horizontal reference plane according to the current mesh and the first location, wherein the horizontal reference plane is parallel to a ground plane of the three-dimensional game scene;

determining a third location of the at least one target mesh surface in the horizontal reference plane from the second location according to a projection of the orientation of the virtual character in the horizontal reference plane;

determining a fourth location of the at least one target mesh surface in a vertical direction according to the current location and orientation of the virtual character and the third location, wherein the vertical direction is perpendicular to the ground plane of the three-dimensional game scene; and obtaining the construction location according to the third location and the fourth location.

Optionally, when space types of the newly-created resources are construction along at least one horizontal plane of at least one cuboid mesh, the step of determining the at least one target mesh surface in the multiple cuboid meshes as the construction location according to the spaces type of the newly-created resources and the current location and orientation of the virtual character includes that:

calculating a current mesh of the virtual character according to the current location of the virtual character;

determining a first location of the at least one target mesh surface in a vertical direction according to the orientation of the virtual character and the current mesh, wherein the vertical direction is perpendicular to a ground plane of the three-dimensional game scene;

determining a second location of the at least one target mesh surface in a horizontal reference plane according to the current location and orientation of the virtual character, the current mesh and the first location, wherein the horizontal reference plane is parallel to the ground plane of the three-dimensional game scene; and obtaining the construction location according to the first location and the second location.

Optionally, when spaces type of the newly-created resources are construction along at least one inner slope of at least one cuboid mesh, the step of determining the at least one target mesh surface in the multiple cuboid meshes as the construction location according to the space types of the newly-created resources and the current location and orientation of the virtual character includes that:

determining an extending direction of the at least one target mesh surface in a horizontal reference plane according to a projection of the orientation of the virtual character in the horizontal reference plane, wherein the horizontal reference plane is parallel to a ground plane of the three-dimensional game scene;

calculating a current mesh of the virtual character and a first location of the virtual character in the current mesh according to the current location of the virtual character;

determining a second location of the at least one target mesh surface in the horizontal reference plane according to the orientation of the virtual character, the current mesh and the first location;

determining a third location of the at least one target mesh surface in a vertical direction according to the orientation of the virtual character and the current mesh, wherein the vertical direction is perpendicular to the ground plane of the three-dimensional game scene; and obtaining the construction location according to the second location and the third location.

Optionally, the construction instruction comprises an extending direction of the newly-created resources in a vertical direction; when the extending direction is vertically upward, the current location of the virtual character is a current location of a head of the virtual character; and when the extending direction is vertically downward, the current location of the virtual character is a current location of foots of the virtual character.

The computer-readable storage medium may use a portable Compact Disc Read-Only Memory (CD-ROM) and include a program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

By means of the method and apparatus for generating virtual resources in a 3D game scene, the electronic device and the computer-readable storage medium in the above exemplary embodiment, on the one hand, since the construction location of newly-created resources are located in at least one cuboid mesh dividing the space of the game scene, the calculation amount in the process of generating the newly-created resources is greatly reduced, and the problem about the efficiency of self-constructing virtual resources by a player during the game is solved. On the other hand, in the process of controlling a virtual character to generate the virtual resources by the player, the construction location of the virtual resource can be determined directly, quickly and conveniently according to the location and orientation of the virtual character, which greatly reduces the operational burden of the player.

The sequence numbers of the foregoing embodiments of the present disclosure are merely for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, multiple elements or assemblies may be combined or integrated to another system, or some characteristics may be omitted or may be not executed. In addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on multiple network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in an element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including multiple instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. A method for generating virtual resources in a three-dimensional game scene, the three-dimensional game scene comprising at least one virtual character and virtual resources, the virtual resources comprising existing resources and newly-created resources, a space of the three-dimensional game scene being divided into a plurality of cuboid meshes, the newly-created resources being part of the virtual resources rendered in response to a construction instruction input by a user, the method comprising:
   acquiring, in response to the construction instruction, a current location and orientation of the virtual character, wherein the construction instruction comprises space type information of the newly-created resources, and space types of the newly-created resources comprise at least one of the following: construction along at least one vertical plane of at least one cuboid mesh, construction along at least one horizontal plane of at least one cuboid mesh, and construction along at least one inner slope of at least one cuboid mesh;
   determining at least one target mesh surface in the plurality of cuboid meshes as a construction location of the newly-created resources according to the space type information and the current location and orientation of the virtual character; and
   rendering and generating the newly-created resources on the at least one target mesh surface;
   wherein when space types of the newly-created resources are constructed along at least one horizontal plane of at least one cuboid mesh, determining the at least one target mesh surface in the plurality of cuboid meshes as the construction location according to the spaces type of the newly-created resources and the current location and orientation of the virtual character comprises:
   calculating a current mesh of the virtual character according to the current location of the virtual character; determining a first location of the at least one target mesh surface in a vertical direction according to the orientation of the virtual character and the current mesh, wherein the vertical direction is perpendicular to a ground plane of the three-dimensional game scene;
   determining a second location of the at least one target mesh surface in a horizontal reference plane according to the current location and orientation of the virtual character, the current mesh and the first location, wherein the horizontal reference plane is parallel to the ground plane of the three-dimensional game scene; and obtaining the construction location according to the first location and the second location.

2. The method as claimed in claim 1, wherein space types of the existing resources comprises at least one of the following: construction along at least one vertical plane of at least one cuboid mesh, construction along at least one horizontal plane of at least one cuboid mesh, and construction along at least one inner slope of at least one cuboid mesh.

3. The method as claimed in claim 1, wherein the at least one target mesh surface is at least one cuboid mesh surface.

4. The method as claimed in claim 1, wherein rendering the newly-created resources on the at least one target mesh surface comprises:
   rendering preview information of the newly-created resources on the at least one target mesh surface; and
   rendering, in response to a confirmation instruction input by the user according to the preview information, the newly-created resources on the at least one target mesh surface.

5. The method as claimed in claim 1, wherein when space types of the newly-created resources are constructed along the at least one vertical plane of at least one cuboid mesh, determining the at least one target mesh surface in the plurality of cuboid meshes as the construction location according to space types of the newly-created resources and the current location and orientation of the virtual character comprises:
   calculating a current mesh of the virtual character and a first location of the virtual character in the current mesh according to the current location of the virtual character; determining a second location of a candidate mesh surface of the construction location in a horizontal reference plane according to the current mesh and the first location, wherein the horizontal reference plane is parallel to a ground plane of the three-dimensional game scene; determining a third location of the at least one target mesh surface in the horizontal reference plane from the second location according to a projection of the orientation of the virtual character in the horizontal reference plane; determining a fourth location of the at least one target mesh surface in a vertical direction according to the current location and orientation of the virtual character and the third location, wherein the vertical direction is perpendicular to the ground plane of the three-dimensional game scene; and obtaining the construction location according to the third location and the fourth location.

6. The method as claimed in claim 5, wherein calculating the current mesh of the virtual character and the first location of the virtual character in the current mesh according to the current location of the virtual character, the method further comprises:
   establishing a three-dimensional coordinate system in the three-dimensional game scene, wherein a XZ plane formed by an X axis and a Z axis is parallel to the ground plane of the three-dimensional game scene, and a Z axis is perpendicular to the ground plane of the three-dimensional game scene.

7. The method as claimed in claim 6, wherein a current location of the virtual character in the three-dimensional game scene is determined by coordinates of the virtual character in the coordinate system.

8. The method as claimed in claim 5, wherein determining the third location of the at least one target mesh surface in the horizontal reference plane from the second location according to the projection of the orientation of the virtual character in the horizontal reference plane comprises:

acquiring a projection of a ray with the current location of the virtual character as an origin and the orientation of the virtual character as a direction in the horizontal reference plane;

determining that the at least one candidate mesh surface intersecting with the projection in the horizontal reference plane is the at least one target mesh surface; and determining that the location of the at least one target mesh surface in the horizontal reference plane is the third location.

9. The method as claimed in claim 1, wherein when spaces type of the newly-created resources are constructed along at least one inner slope of at least one cuboid mesh, determining the at least one target mesh surface in the plurality of cuboid meshes as the construction location according to the space types of the newly-created resources and the current location and orientation of the virtual character comprises:

determining an extending direction of the at least one target mesh surface in a horizontal reference plane according to a projection of the orientation of the virtual character in the horizontal reference plane, wherein the horizontal reference plane is parallel to a ground plane of the three-dimensional game scene;

calculating a current mesh of the virtual character and a first location of the virtual character in the current mesh according to the current location of the virtual character;

determining a second location of the at least one target mesh surface in the horizontal reference plane according to the orientation of the virtual character, the current mesh and the first location;

determining a third location of the at least one target mesh surface in a vertical direction according to the orientation of the virtual character and the current mesh, wherein the vertical direction is perpendicular to the ground plane of the three-dimensional game scene; and obtaining the construction location according to the second location and the third location.

10. The method as claimed in claim 9, wherein the construction instruction comprises an extending direction of the newly-created resources in a vertical direction; when the extending direction is vertically upward, the current location of the virtual character is a current location of a head of the virtual character; and when the extending direction is vertically downward, the current location of the virtual character is a current location of feet of the virtual character.

11. The method as claimed in claim 9, wherein determining the second location of the at least one target mesh surface in the horizontal reference plane according to the orientation of the virtual character comprises:

determining, according to a relative location of the virtual character in the current mesh and the orientation of the virtual character, whether to perform forward and backward offsets on the basis of the location of the current mesh in the horizontal reference plane, so as to determine the second location of the at least one target mesh surface in the horizontal reference plane.

12. The method as claimed in claim 1, wherein the construction instruction further comprises: material attributes and quantity of the newly-created resources.

13. The method as claimed in claim 1, wherein the at least one vertical plane is at least one of four planes perpendicular to a ground plane of the three-dimensional game scene in the at least one cuboid mesh.

14. The method as claimed in claim 1, wherein the at least one horizontal plane is at least one of two planes parallel to a ground plane of the three-dimensional game scene in the at least one cuboid mesh.

15. The method as claimed in claim 1, wherein the at least one inner slope is at least one diagonal section in the at least one cuboid mesh.

16. The method as claimed in claim 1, wherein the second location of the at least one target mesh surface in the horizontal reference plane is the same as the location of the at least one target mesh surface in the plane.

17. An electronic device, comprising:

at least one processor; and at least one memory, configured to store at least one executable instruction of the at least one processor, wherein the at least one processor is configured to execute the method for generating virtual resources in a three-dimensional game scene by executing the at least one executable instruction; the three-dimensional game scene comprising at least one virtual character and virtual resources, the virtual resources comprising existing resources and newly-created resources, a space of the three-dimensional game scene being divided into a plurality of cuboid meshes, the newly-created resources being part of the virtual resources rendered in response to a construction instruction input by a user, the method comprising:

acquiring, in response to the construction instruction, a current location and orientation of the virtual character, wherein the construction instruction comprises space type information of the newly-created resources, and space types of the newly-created resources comprise at least one of the following: construction along at least one vertical plane of at least one cuboid mesh, construction along at least one horizontal plane of at least one cuboid mesh, and construction along at least one inner slope of at least one cuboid mesh;

determining at least one target mesh surface in the plurality of cuboid meshes as a construction location of the newly-created resources according to the space type information and the current location and orientation of the virtual character; and rendering and generating the newly-created resources on the at least one target mesh surface;

wherein when space types of the newly-created resources are constructed along at least one horizontal plane of at least one cuboid mesh, determining the at least one target mesh surface in the plurality of cuboid meshes as the construction location according to the spaces type of the newly-created resources and the current location and orientation of the virtual character comprises:

calculating a current mesh of the virtual character according to the current location of the virtual character;

determining a first location of the at least one target mesh surface in a vertical direction according to the orientation of the virtual character and the current mesh, wherein the vertical direction is perpendicular to a ground plane of the three-dimensional game scene;

determining a second location of the at least one target mesh surface in a horizontal reference plane according to the current location and orientation of the virtual character, the current mesh and the first location, wherein the horizontal reference plane is parallel to the ground plane of the three-dimensional game scene; and obtaining the construction location according to the first location and the second location.

18. A non-transitory storage medium, storing at least one computer program, wherein the at least one computer program is executed by at least one processor to implement the method for generating virtual resources in a three-dimensional game scene, the three-dimensional game scene comprising at least one virtual character and virtual resources, the virtual resources comprising existing resources and newly-created resources, a space of the three-dimensional game scene being divided into a plurality of cuboid meshes, the newly-created resources being part of the virtual resources rendered in response to a construction instruction input by a user, the method comprising:

acquiring, in response to the construction instruction, a current location and orientation of the virtual character, wherein the construction instruction comprises space type information of the newly-created resources, and space types of the newly-created resources comprise at least one of the following: construction along at least one vertical plane of at least one cuboid mesh, construction along at least one horizontal plane of at least one cuboid mesh, and construction along at least one inner slope of at least one cuboid mesh;

determining at least one target mesh surface in the plurality of cuboid meshes as a construction location of the newly-created resources according to the space type information and the current location and orientation of the virtual character; and rendering and generating the newly-created resources on the at least one target mesh surface;

wherein when space types of the newly-created resources are constructed along at least one horizontal plane of at least one cuboid mesh, determining the at least one target mesh surface in the plurality of cuboid meshes as the construction location according to the spaces type of the newly-created resources and the current location and orientation of the virtual character comprises:

calculating a current mesh of the virtual character according to the current location of the virtual character;

determining a first location of the at least one target mesh surface in a vertical direction according to the orientation of the virtual character and the current mesh, wherein the vertical direction is perpendicular to a ground plane of the three-dimensional game scene;

determining a second location of the at least one target mesh surface in a horizontal reference plane according to the current location and orientation of the virtual character, the current mesh and the first location, wherein the horizontal reference plane is parallel to the ground plane of the three-dimensional game scene; and obtaining the construction location according to the first location and the second location.

* * * * *